United States Patent Office 3,213,047
Patented Oct. 19, 1965

3,213,047
COATING COMPOSITIONS COMPRISING ALDE-
HYDE MODIFIED AMIDE INTERPOLYMER AND
HYDROCARBON SOLUBLE CELLULOSE ETHER
Erwin J. Kapalko, Muskego, Wis., assignor to Pittsburgh
Plate Glass Company, Pittsburgh, Pa., a corporation
of Pennsylvania
No Drawing. Filed Dec. 27, 1961, Ser. No. 162,579
11 Claims. (Cl. 260—15)

This invention relates to compositions adaptable to flow-coating techniques and more particularly the invention relates to compositions comprising aldehyde-modified unsaturated carboxylic acid amide interpolymers blended with an alkyl cellulose.

In copending application Serial No. 749,583, filed July 21, 1958, now U.S. Patent No. 3,037,963, there are disclosed many useful resinous products prepared from unsaturated carboxylic acid amides such as acrylamide or methacrylamide. Preparation of these resinous products generally involves forming an interpolymer of such unsaturated carboxylic acid amides with at least one other polymerizable ethylenically unsaturated monomer and subsequently reacting the interpolymer with an aldehyde such as formaldehyde in the presence of an alcohol such as butanol or 2-ethylhexanol. The resulting resins range from soft, flexible materials to very hard solids, depending upon the choice of monomers utilized in preparing the amide interpolymer which in turn is reacted with the aldehyde and the alcohol.

The resins prepared in accordance with the methods described in said copending application Serial No. 749,583 are particularly useful in coating compositions. They may be blended advantageously with one or more other resinous materials such as epoxide resins, vinyl resins, amine resins such as melamine-formaldehyde or urea-formaldehyde resins, alkyd resins, nitrocellulose, polyethylene, polyalkylene oxide reaction products with certain hydroxyl or amine substituted compounds such as the reaction products of trimethylolpropane with propylene oxide or ethylene diamine with propylene oxide or ethylene oxide, and the like. It is particularly advantageous to add a minor amount (0.5 to 2.0 percent based on the weight of the aldehyde-modified interpolymer) of an adduct of an unsaturated dicarboxylic acid or anhydride and a copolymer of a vinyl aryl compound with an unsaturated aliphatic alcohol to improve adhesion to untreated steel surfaces. For a more complete disclosure of the said adducts reference is made to U.S. application Serial No. 39,240, filed June 28, 1960.

Such resinous blends form films with excellent flexibility, recoat adhesion and freedom from undesirable color formation even on overbaking of the film, stain resistance, grease resistance, detergent resistance and gloss. They are particularly useful as coating compositions for appliances such as ranges, refrigerators, air conditioners, washers, water heaters and the like, and for the strip-coating of metals such as aluminum, steel, and the like.

Flow-coating techniques are well known for applying coatings to objects which are large in size compared with the area surface to be coated or to objects which are advantageously dipped because they contain areas which are inaccessible to spraying, brushing and/or roll-coating techniques.

It is an advantage to employ flow-coating techniques instead of dipping tanks because of the great difference in the initial charge of coating materials. With certain objects it may require a hundred times as much coating material in a dip tank to do the same job as could be accomplished with flow-coating apparatus.

The operation of a flow coater is characterized by flowing the material over the objects from a group of nozzles and recycling excess coating material which drips into a reservoir from the objects. One specific type of flow coater which may be employed in the appliance coating field comprises a toroidal manifold with circumferentially spaced nozzles, the axis of which defines at least certain radii of the circle defined by the toroidal manifold. In operation the coating material enters the said manifold, which uniformly distributes the coating material into each nozzle. As the coating material gushes from the nozzles and continues across the diameter, the extension formed by the stream with said nozzle is pictured as spokes of a wheel converging upon the center of the circle. The appliance parts to be coated are moved through the center of the converging streams; they are coated with an overabundance of material and the excessive amounts are shed into a reservoir before going to the next operation.

While this method of applying the coating composition is extremely economical and practical, it also has deficiencies. Particularly, this method has a strong tendency to entrap air during the coating procedure, resulting in the formation of many bubbles on the surface of the coated object. In most instances formulations which are to be used for flow coating contain relatively "slow" solvents. The formed bubbles are carried to the lower appendages or to the inaccessible "blind" areas of the articles being coated because slower evaporation of the solvents precludes early breakage of the bubbles. Many times the bubbles, even though they break, form concentrations of paint which prevent or make difficult the assembling of the coated parts of the article.

The aforementioned aldehyde-modified amide interpolymers are no exception. When used as vehicles in flow coating enamels the problems of bubble and bead formation are usually present.

It has now been discovered that this difficulty can be overcome by blending the aldehyde-modified carboxylic acid amide interpolymers with an alkyl cellulose, particularly ethyl cellulose, prior to or during the operation of the flow coating apparatus. The invention is characterized by a composition comprising an alkyl cellulose, preferably ethyl cellulose or ethyl hydroxyethyl cellulose, and an interpolymer of a polymerizable unsaturated carboxylic acid amide and at least one other monomer containing a $CH_2=C<$ group, said interpolymer being characterized by having amido hydrogen atoms replaced by the structure

wherein R is a member of the class consisting of hydrogen and hydrocarbon radicals and $R_1$ is a member of the class consisting of hydrogen and a radical derived by removing the hydroxyl group from a monohydric alcohol. The invention also contemplates the use of other film-forming materials to be used as modifying agents or plasticizers. The cellulose material may be employed in amounts up to about 5 percent by weight of the total resins solids, but it is preferred that from 0.1 to about 2 percent by weight of the total resins solids be employed. Amounts as little as .01 percent by weight of the total resins solids manifest a pronounced effect in overcoming bubbling during the flow coating.

It is preferred that the alkyl cellulose be added to the aldehyde-modified amide enamels during the flow coat operation. This procedure is advantageous because it is easier to determine the minimum amounts necessary to overcome any immediate problems of bubble or bead formation; increasing amounts of the alkyl cellulose are added to the flow coater until the coated parts appear free from such formations. However, preblended compositions comprising the aldehyde-modified amide interpolymer with the alkyl cellulose may also be utilized. They are stable and therefore may be sold as commercial materials.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

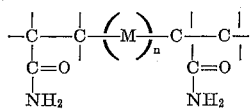

wherein M represents a unit of a monomer polymerizable with acrylamide, and $n$ represents a whole number greater than 1. For example, if styrene were utilized as the second monomer, M would represent the unit

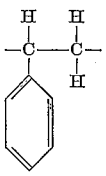

The short chain interpolymer then reacts with an aldehyde, as represented by formaldehyde, to give the structure

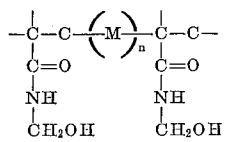

wherein M and $n$ have the significance set forth hereinabove.

In the event the aldehyde is utilized in the form of a solution in butanol or other alkanol, etherification will take place so that at least some of the methylol groups in the above structure will be converted to groups of the structure

wherein R is selected from the class consisting of hydrogen and a saturated lower aliphatic hydrocarbon radical having its free valences on a single carbon atom, and $R_1$ is a member of the class consisting of hydrogen and the radical derived by removing the hydroxyl group from the alkanol utilized.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol, or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivative such as N-carbamyl maleimide may also be utilized.

Any polymerizable monomeric compound containing at least one $CH_2=C<$ group, preferably in terminal position, may be polymerized with the unsaturated carboxylic acid amide. Examples of such monomers include:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2-tetrachloroethylene, 1-chloro-2,2,2-trifluoroethylene, chlorobutadiene and other halogenated diolefinic compounds;

(3) Esters of organic and inorganic acids, such as vinyl acetate, vinyl propionate, vinyl butyrate, vinyl isobutyrate vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethyallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of unsaturated carboxylic acid amide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like, are conventionally used for this purpose. However, other chain modifying agents or "short stopping" agents such as cyclopentadiene, allyl acetate, allyl carbamate, alpha-methyl styrene, alpha-methyl styrene dimers, and the like, can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of reaction is obtained by adding the amide to the polymerization mixture incrementally. Good agitation is also desirable.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer and blends thereof with other resins is described in detail in U.S. Patents 2,870,116, 2,870,117, 2,940,943, 2,940,944, and 2,940,945, and in application Serial No. 672,358, filed July 17, 1957, now U.S. Patent 3,011,993, the disclosure of which are incorporated herein by reference.

The amide interpolymer resin prepared according to the disclosures in the above-identified patents is reacted with an aldehyde, preferably in the presence of an alcohol. Formaldehyde in solution in water (formalin) or in an alkanol such as butanol, or a formaldehyde-yielding substance such as paraformaldehyde, trioxymethylene, or hexamethylenetetramine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation, as may a portion of the solvent if desired. In fact, when the aldehyde is utilized in the form of a solution in an alkanol such as butanol it is desirable that approximately half of the butanol be distilled off at the end of the reaction period and replaced by another solvent, such as xylol. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application Serial No. 775,380, filed November 21, 1958, now U.S. Patent No. 3,079,434 does not require reaction of the polymer with an aldehyde since the N-alkoxyalkyl amide monomers already contain —ROH or

groups, wherein R and $R_1$ have the meaning set forth above.

Regardless of the method by which the resinous material is obtained, it will contain in the polymer chain recurrent groups of the structure

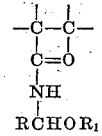

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

The cellulose materials which may be employed in the instant invention are those which have been partially substituted at the hydroxyl groups with a saturated aliphatic hydrocarbon radical, preferably an ethyl radical. An alkyl cellulose is an ether of cellulose made by reacting alkali cellulose with an alkyl chloride under pressure followed by precipitation of water and subsequent purification. The reaction may be expressed as follows:

Alkali cellulose + RCl → XOR + alkali chloride wherein R represents a saturated aliphatic radical (alkyl radical) having at least two carbon atoms, and X represents the cellulose radical.

It is important that the cellulose be substituted with alkyl ether groups to an extent so that it is hydrocarbon soluble but not to such an extent that it becomes substantially incompatible with solvents and the aldehyde-modified carboxylic acid amide resins. The structure of the alkyl ether of cellulose may be represented as follows, although it should be recognized that an actual product would probably be less symmetrical:

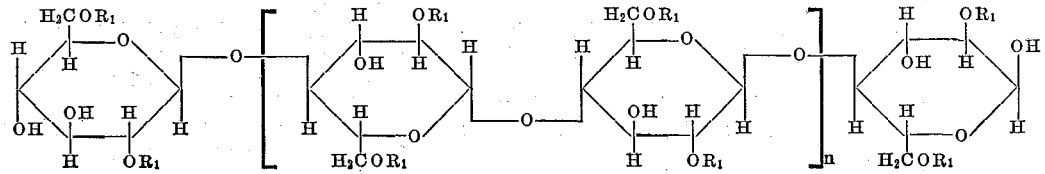

wherein $R_1$ represents a member of the group consisting of hydrogen, a hydroxyethyl radical and a lower alkyl radical having from 2 to 8 carbon atoms and wherein the lower alkyl radical is present in amounts sufficient to impart solubility in hydrocarbon solvents but not to such an extent that the compatibility with other resinous materials is limited.

It is preferred that the cellulose contain from about 2.0 to about 2.38 alkoxyl group per anhydroglucose unit. If more than about 47 percent ethoxyl groups are present in relation to the number of hydroxyls per anhydroglucose unit, only insignificant results are obtained in overcoming bubbling during flow coating operations. In order to get significant compatibility with other resins, and solubility with hydrocarbon solvents, it is preferred that at least 40 percent of the hydroxyl group be substituted with the alkoxyl radicals.

In addition to an ethyl cellulose having less than 47 percent ethoxyl groups, an ethyl cellulose partially substituted with hydroxyethyl groups may also be employed. Ethyl hydroxyethyl cellulose is a mixed ether of cellulose. It is important, however, that the hydroxyethyl groups not be present to such an extent that the cellulose becomes water sensitive and relatively insoluble in both aromatic and aliphatic hydrocarbon solvents. Ethyl hydroxyethyl cellulose is prepared by reacting ethyl cellulose with ethylene oxide to a limited extent so that the oxyethylene unit substituted on the hydroxyl group is not further reacted to form a polyethylene oxide chain.

Ethyl hydroxyethyl cellulose may be obtained commercially. One such product is identified by the trademark EHEC (Hercules Powder Company). EHEC may be obtained in three grades—high viscosity, 125–250 cps.; low viscosity, 20–35 cps.; and very low viscosity, 10–19 cps. (viscosity measurements are obtained as a 5 percent solution in a solvent containing 20 percent ethanol and 80 percent toluene).

It has also been found that certain of the higher alcohols, particularly the alcohols containing from 6 to 10 carbon atoms, tend to assist in overcoming bubble formation in flow coating operations utilizing the aldehyde-modified interpolymers of the instant invention. Isooctyl alcohol is particularly advantageous in the instances wherein bubbling persists even after addition of the said alkyl ether of the cellulose is employed. It is also an advantage to employ one of the higher aliphatic alcohols with the alkyl ether because smaller amounts of the said ether may be employed to effect the anti-bubbling action.

The higher aliphatic alcohol is usually employed in amounts ranging from about 4 to about 6 times the weight of the alkyl cellulose or ethyl hydroxyethyl cellulose.

However, even when used in proportions as low as 1 to 1 or lower the amount of the alkyl cellulose necessary to overcome the bubbling action is lowered.

The following examples are given by way of illustration and not by way of limitation. All parts and percentages are by weight unless otherwise specified.

Example I

The following examples illustrate the preparation of the aldehyde-modified acrylamide interpolymer.

| | Parts by weight |
|---|---|
| Acrylamide | 30 |
| Styrene | 165 |
| Methacrylic acid | 5 |
| High boiling aromatic naphtha (Solvesso 150) | 100 |
| Butanol | 100 |

The above ingredients were admixed in the presence of cumene hydroperoxide (2 parts) and tertiary dodecyl mercaptan (4 parts) for two hours. Cumene hydroperoxide (1 part) was then added and the mixture refluxed for three successive 2-hour intervals, after each of which additions of cumene hydroperoxide (1 part) were made. After the fourth reflux interval butyl Formcel (63 parts), maleic anhydride (0.8 part) were added to the mixture which was azeotropically distilled for three hours to remove the water of reaction. The final product was then blended with 22.2 parts of Epon 1001 and 22.2 parts of butyl Cellosolve. The resulting resinous composition had the following properties:

| | |
|---|---|
| Solids (percent) | 48–52 |
| Viscosity (Gardner-Holdt) | U–W |
| Color | 6 max. |
| Wt./gal. | 8.1 |
| Acid value | 6–7.5 |

The following example relates to the preparation of one of the preferred aforementioned adducts disclosed in said U.S. application Serial No. 39,240.

Example II

The following materials were charged into a vessel equipped with stirrer, condenser and temperature measuring means:

| | Parts by weight |
|---|---|
| Allyl alcohol-styrene copolymer (Shell X–450, hydroxyl equivalent per 100 grams—0.45; hydroxyl groups per molecule—5.2) | 85.3 |
| Maleic anhydride | 14.7 |
| Methylethyl ketone | 33.3 |

The above components were refluxed until the product had an acid value of 60 to 64 (about 4 to 8 hours). The product was then diluted to 50 percent solids with toluene; the resulting resinous product had the following analysis:

| | |
|---|---|
| Solids (percent) | 50 |
| Hydroxyl value | 65 |
| Acid value | 42 |
| Viscosity (Gardner-Holdt) | E–F |

Example III

A pigment paste was made up as follows:

| | Part by weight |
|---|---|
| Interpolymer of Example I (50 percent solution in 45:55 butanol-toluene solvent mixture) | 110 |
| Polyethylene (20 percent gel in xylene) | 55 |
| Cellosolve acetate | 55 |
| Reoderant (Maskit) | 3.625 |
| High boiling aromatic naphtha (Velsicol 45) | 216.375 |
| Titanium dioxide pigment (rutile) | 965 |

The above ingredients were charged into a pebble mill and ground for 16 hours. One hundred and forty-five (145) parts more of the above 50 percent solution of the interpolymer of Example I were added to the mill as letdown and ground until homogeneous. Employing the instant pigment paste, a flow coat enamel was prepared from the following ingredients:

| | Parts by weight |
|---|---|
| Product of Example II (allyl alcohol-styrene copolymer, Shell's X–450) | 5 |
| Trimethylol propane (propylene oxide reaction product, Pluracol TP–2540) | 45 |
| Silicone oil (2 percent solution in xylene of Linde R–12) | 2 |
| Product of Example I (aldehyde-modified acrylamide-styrene copolymer) | 395 |
| High boiling aromatic naphtha (Enjay 100) | 110 |
| Magnesium silicate (talc) | 35 |
| Above pigment paste | 445 |

The above components were intermixed to form a homogeneous enamel composition.

Eleven hundred (1100) parts of the above enamel was blended with 400 parts of the high boiling aromatic naphtha (Hi-Sol 15) to form a composition having a viscosity of 38.5 seconds measured by a Zahn Cup No. 1 at 80° F. This composition was then employed in a flow coater which was run at 9 feet per minute with 48 inches between hooks. The parts to be coated were first phosphatized with a Bonderite 1077 treatment and the parts were run through the flow coater. The parts were then moved into a drying oven where the enamel was flashed at 260° F. for 30 minutes. A finish coat of the same enamel was then electrostatically sprayed onto the parts with a Ransburgh No. 2 disc. The parts were then moved into a finish oven set for 350° F. in a first zone and 320° F. in a second zone producing a 40-minute heat curve around 320° F. and peaking for a couple of minutes near the beginning at 335° F. The finished parts were considered rejects because of bubbles and blisters or beads along the drain edges and heavy film. The flow coat tank was then readjusted to contain 1100 parts of the above enamel, 22.5 parts of a solution [containing 75 parts of high viscosity ethyl hydroxyethyl cellulose (EHEC, Hercules Powder Company), 340 parts isooctyl alcohol and 340 parts of high boiling aromatic naphtha (Enjay 150)] and 31.8 parts of butyl carbitol. The composition was further adjusted with high boiling aromatic naphtha (Hi-Sol 15) to obtain a composition having a viscosity of 30 seconds as measured by a Zahn Cup No. 1. The previously outlined coating procedure was repeated with the result that the drain edges were substantially free of bubbles, blisters and beads.

Example IV

An enamel composition was made up as follows:

| | Parts of weight |
|---|---|
| Product of Example I (aldehyde-modified interpolymer of acrylamide and styrene) | 30 |
| Zinc octoate | 10 |
| Silicone oil (2 percent solution in xylene of Linde R–12) | 2 |
| High boiling aromatic naphtha (Enjay 100) | 55 |
| Titanium dioxide pigment (rutile) | 280 |

The above ingredients were charged into a pebble mill and ground for 16 hours. Seventy three (73) parts more of the product of Example I was added to the mill as reducer and ground until the resulting pigment paste was homogeneous. An enamel was prepared by blending the pigment paste with 510 parts more of the product of Example I, 15 parts of isophorone, 20 parts butyl carbitol, 15 parts of Enjay 100 and 5 parts of zinc octoate.

A flow coater similar to the one used in the previous example was filled with an enamel composition comprising 507 parts of the above enamel and 148 parts of a high boiling aromatic naphtha. Bonderite appliance parts were then run through the flow coater as before. The resulting coated parts manifested bubbles and sagging on the edges and were considered rejects for this reason. Upon readjusting the tank contained 9.75 parts of a 10 percent solution of high viscosity ethyl hydroxyethyl cellulose (EHEC), in a high boiling aromatic naphtha (Solvesso 100), 6.91 parts isooctyl alcohol, 507 parts of said enamel composition and 148 parts of Solvesso 100. The charge was then adjusted to a viscosity of 30 seconds at 86° F. in a No. 2 Zahn Cup with more Solvesso 100. The flow coater was rerun with the result that the coated parts were free from bubbles and sagging, particularly at the edges.

*Example V*

The following example demonstrates the anti-bubbling properties of the compositions of the instant invention by comparison.

Using the enamel composition of Example III as a control the following compositions were made up:

(A) Blends of 1000 parts of the enamel composition with 15 parts of a 10 percent solution of an ethyl cellulose (Hercules Powder Company's K-14), 45.5 to 46.8 parts ethoxyl substitution, 12-16 cps., 20:80 butanol-xylene solvent mixture.

(B) One thousand parts of the said enamel composition with 15 parts of a 10 percent solution of a commercial ethyl cellulose identified as N-14, 47.5-49 percent ethoxyl substitution, 12-16 cps.

(C) One thousand parts of the said enamel composition with 15 parts of a 10 percent solution of high viscosity EHEC in a 20:80 butanol-xylene solvent mixture.

Each of the above compositions was reduced by the ratio of three parts of the enamel to two parts of high boiling aromatic solvent (Solvesso 100). The reduced enamels were placed in a Waring blender for 15 seconds and poured onto a steel panel that was placed at a 45° angle. The flow of the bubbles and the time needed to break the bubbles at the bead were observed. The results were as follows:

Control: Bubbles remained on the bead of the panel after 15 minutes.
Sample A: All bubbles were gone from the panel in 5 minutes.
Sample B: Bubbles remained on the bead of the panel after 15 minutes.
Sample C: All bubbles were gone from the bead of the panel within 5 minutes.

Anti-bubbling compositions within the scope of the instant invention may also be prepared from aldehyde-modified interpolymers which have been prepared utilizing vinyl monomers other than styrene, such as acrylonitrile, methyl methacrylate, vinyl toluene, ethyl acrylate and the like. In each and every instance alkyl cellulose falling within the aforementioned alkoxyl substitution range may be used with the said aldehyde-modified amide interpolymers to obtain the anti-bubbling compositions. The commercially available G-type ethyl cellulose may be substituted for the K type in the above examples.

Although specific examples have been set forth hereinabove, it is not intended that the invention be limited solely thereto, but to include all of the variations and modifications falling within the scope of the appended claims.

I claim:
1. A coating composition comprising a compatible mixture of from about 0.01 to about 5 percent by weight of a hydrocarbon-soluble alkyl cellulose ether having from 2 to 8 carbon atoms in each alkyl and an aldehyde-modified carboxylic acid amide interpolymer of a polymerizable unsaturated carboxylic acid amide and at least one other monomer containing a $CH_2=C<$ group, said interpolymer being characterized by having amido hydrogen atoms replaced by the structure

wherein R is a member of the class consisting of hydrogen and lower aliphatic hydrocarbon radicals and $R_1$ is a member of the class consisting of hydrogen and a radical derived by removing the hydroxyl group from a monohydric alcohol, at least some of the groups represented by $R_1$ being said radical.

2. The resinous composition of claim 1 wherein the said alkyl cellulose has about 2 to 2.38 alkoxyl groups per anhydroglucose unit of the cellulose.

3. The resinous composition of claim 1 wherein at least some of the hydroxyl groups of the anhydroglucose unit are substituted with ethoxyl groups.

4. The resinous composition of claim 1 wherein at least some of the hydroxyl groups of the said anhydroglucose unit are substituted with hydroxyethoxyl groups.

5. The resinous composition of claim 2 wherein there is also present a saturated aliphatic alcohol having from 6 to 10 carbon atoms.

6. The resinous composition of claim 5 wherein the alcohol is isooctyl alcohol.

7. The resinous composition of claim 1 wherein the interpolymer is an interpolymer of acrylamide, styrene and methacrylic acid.

8. The resinous composition of claim 2 wherein there is present a reaction product of trimethylol propane and propylene oxide.

9. In a method of flow coating with an enamel comprised of the resinous composition of claim 1, the improvement which comprises adding a hydrocarbon-soluble alkyl cellulose ether having from 2 to 8 carbon atoms in each alkyl group to the enamel composition during the flow coating with the said enamel.

10. The composition of claim 1 in which at least about 50 percent of the groups represented by $R_1$ are alkyl groups.

11. The composition of claim 10 in which said alkyl groups are butyl.

References Cited by the Examiner

UNITED STATES PATENTS

| | | | |
|---|---|---|---|
| 2,123,599 | 7/38 | Fikentscher et al. | 260—17 |
| 2,680,110 | 6/54 | Loughran et al. | 260—17 |
| 2,796,656 | 6/57 | Schappel et al. | 260—17 |
| 2,940,943 | 6/60 | Christenson et al. | 260—17 |

FOREIGN PATENTS 593,547   10/47   Great Britain.

LEON J. BERCOVITZ, *Primary Examiner.*